(No Model.) 2 Sheets—Sheet 2.

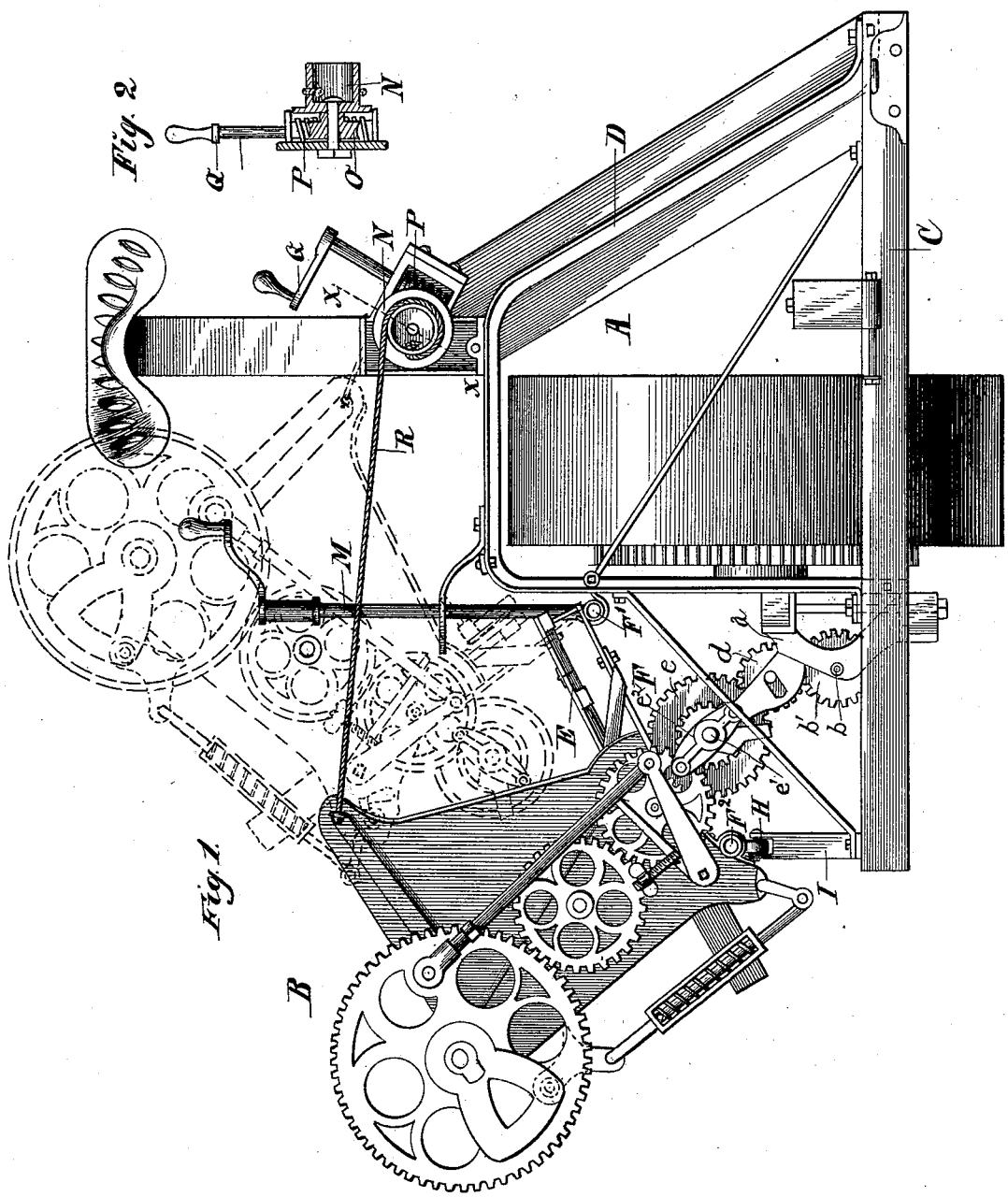

E. A. PECK.
GRAIN BINDER.

No. 373,601. Patented Nov. 22, 1887.

Witnesses. Inventor:
Ezra A. Peck,
By Coburn & Thacher
Atty.

United States Patent Office.

EZRA A. PECK, OF PLANO, ILLINOIS, ASSIGNOR TO THE PLANO MANUFACTURING COMPANY, OF SAME PLACE.

GRAIN-BINDER.

SPECIFICATION forming part of Letters Patent No. 373,601, dated November 22, 1887.

Application filed May 27, 1885. Serial No. 166,880. (No model.)

*To all whom it may concern:*

Be it known that I, EZRA A. PECK, a citizen of the United States, residing at Plano, in the county of Kendall and State of Illinois, have invented certain new and useful Improvements in Grain-Binders, which are fully set forth in the following specification, reference being had to the accompanying drawings, in which—

Figure 3:
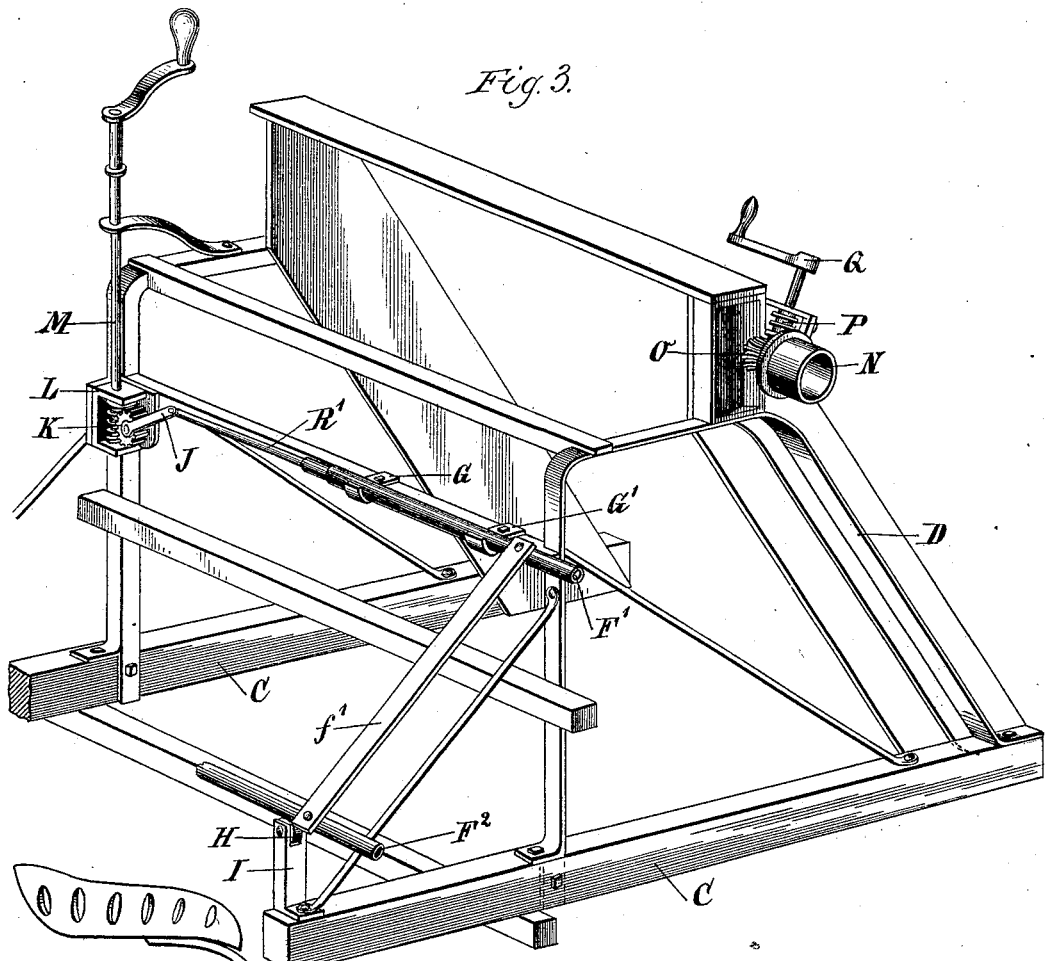
Figure 4:
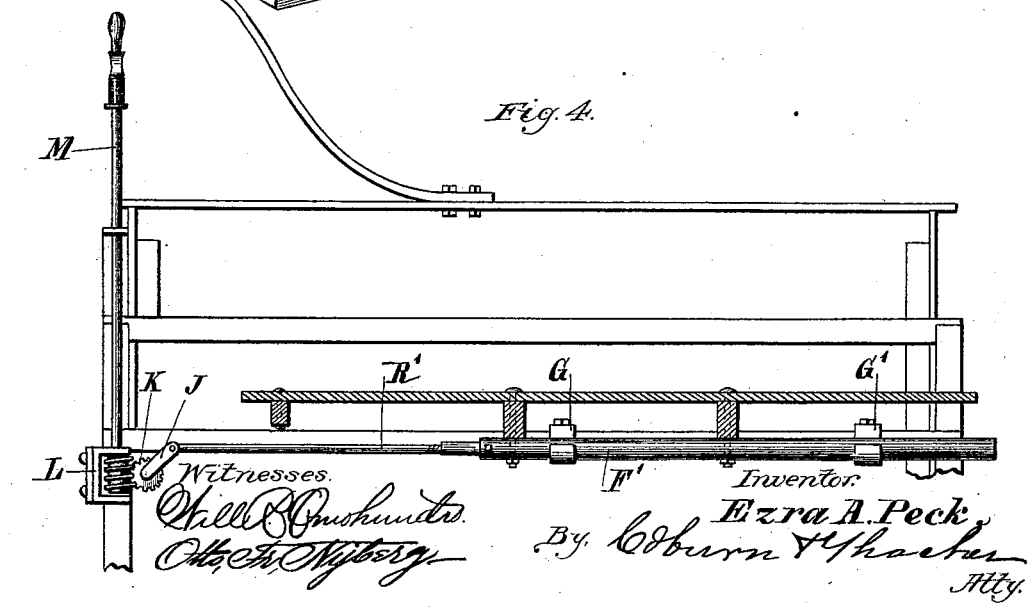

Figure 1 is a front elevation of the main wheel and a portion of the frame and binding mechanism of a harvester embodying my improvements. Fig. 2 is a sectional view of the mechanism for hoisting and lowering the binder, taken on the line $x\ x$, Fig. 1; Fig. 3, a perspective view of the main frame; Fig. 4, a side elevation of the upper portion of the main frame, showing details of the mechanism for imparting lateral motion to the binder mechanism.

My invention relates to harvesters, which are provided with automatic binders, and especially to mechanism by which the binders may be raised or lowered and laterally adjusted.

I will proceed to describe in detail the construction and operation of my improved mechanism, the same being understood to be applied to a harvester of the usual construction; and as these improvements relate only to certain parts of the machine shown in the drawings, I shall describe only so much of the harvester as will be necessary in order to have a clear understanding of the improvements which I desire to claim as my invention.

In Fig. 1, A is the main frame; B, the binding mechanism taken as a unit. C is the main sill of the frame; D, the elevator-frame; E, the deck, and F the frame on which the binding mechanism is mounted.

The same letters represent like parts of the machine in the different figures.

The binding mechanism is mounted on an independent frame, F, and this frame is constructed of iron, the upper and lower parts, F' and F², being made of gas-pipe connected by iron straps or braces $f'\ f^2$. This frame is supported at three points, the upper bar, F', resting in the two brackets G G'. and the lower bar, F², resting on the anti-friction roller H, which is supported in the strut I, fastened to the sill of the main frame. Attached to the rear end of the upper bar of the frame on which the binding mechanism rests is a link, R'. This link is connected with the bar F' by a swivel-joint, which allows the bar to turn easily on the link-pivots, this joint, as shown in the drawings, Fig. 4, being made by a loose screw-connection between the link and the bar; but an ordinary swivel will do just as well. To the rear end of the link R' is attached a crank-arm, J. This crank-arm, at the end not attached to the link R', is fastened securely to the pinion-wheel K, which pinion-wheel is supported in the box or frame L. There is also supported in the box or frame, and by proper devices fastened to the main frame of the harvester, a shaft, M, which is operated by a crank within easy reach of the driver when seated on the machine. This shaft is provided at its lower end with worm-threads, which engage with the pinion-wheel K. It is obvious that the shaft being turned will operate the pinion-wheel, which will in turn affect the crank J and cause the crank to assume different angular positions in relation to the link R', and the crank J being pivoted to the rear end of the link R', and this link being swivel-jointed to the bar F', the frame F may be moved backward and forward by changing the position of the crank-arm, or, in other words, by turning the shaft M. It is to facilitate this lateral adjustment that the lower bar of the frame F is made to rest upon the anti-friction roller H rather than upon a fixed removable support.

In order to accomplish the raising and lowering of the frame F, and the binding mechanism attached thereto, I have provided a drum, N. This drum is supported in proper manner and attached to the main frame. Attached to one end of the drum is a worm-wheel, O, which is in engagement with the worm P, which worm is operated by crank Q, placed in convenient operating distance for the driver. A rope, R, is attached at one end to some part of the binding mechanism, (as shown in the drawings it is attached to the upper outer corner of the guard,) and the other end is attached to the drum N. By operating the worm P the drum may be easily and rapidly revolved and the rope wound around the same, and thus the binder easily raised to the position shown by the dotted lines in Fig. 1. By this or other proper mechanism the binder and the frame on which it rests can be easily raised when desired, and the harvester may thus be driven through any gate or fence opening or other space through which a harvester could be driven if unencumbered with a binder attachment.

In order to permit the swinging up of the binder it is obvious that the gearing must be constructed and arranged so as to be readily divided. A part of it must of course be on the main frame and a portion on the binder-frame, and the two sections must be readily separable with the movement of the binder-frame. On the main frame is a bracket, $a$, in which one end of the shaft $b$ is mounted, this shaft being the one at the side of the machine from which motion is communicated to the binding mechanism. It is provided with a pinion, $b'$, for this purpose. A pinion, $d$, is mounted upon an arm of the bracket $a$, the latter being slotted, so as to permit the adjustment of the pinion. This pinion $d$ engages with a gear-wheel, $e$, which is secured to the shaft $e'$, that carries the usual clutch and pinion, $e^2$, common to binders for stopping and starting their movement. The shaft $e'$ is, however, mounted in bearings which are fastened to the binder-frame, and so will be carried up and down by the swinging movement of the latter, and the gearing is separable between the pinion $d$ and the gear-wheel $e$. The clutch-pinion on the shaft $e$ connects with and drives the usual train of gearing to the main driving-gear of the binder. In order to accommodate the sliding movement of the binder the pinion $d$ may be long enough to permit this adjustment without disconnecting from the gear-wheel $e$, or the latter may be made to slide on its shaft by means of a spline and groove.

Having thus fully described my invention, what I claim as new, and desire to secure by Letters Patent, is—

1. The main frame of the harvester, in combination with the binder-frame connected to the former by hinged joints, the drum N, screw-pinion O, worm P, and rope R, substantially as and for the purposes set forth.

2. The binder-frame F, in combination with the pinion K, provided with a crank-arm, and the link-rod R', connected at one end to the crank-arm and at the other by a swivel-joint to the binder-frame, to permit the latter to be swung upward, substantially as and for the purposes set forth.

EZRA A. PECK.

Witnesses:
 W. H. JONES,
 LEONARD WATSON.